United States Patent
Zhang

(10) Patent No.: US 7,239,885 B2
(45) Date of Patent: Jul. 3, 2007

(54) INITIAL DOWNLINK TRANSMIT POWER ADJUSTMENT FOR NON-REAL-TIME SERVICES USING DEDICATED OR SHARED CHANNEL

(75) Inventor: Guodong Zhang, Patchogue, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 150 days.

(21) Appl. No.: 10/725,789

(22) Filed: Dec. 2, 2003

(65) Prior Publication Data
US 2005/0096075 A1    May 5, 2005

Related U.S. Application Data

(60) Provisional application No. 60/517,698, filed on Nov. 5, 2003.

(51) Int. Cl.
H04B 7/00 (2006.01)
H04Q 7/20 (2006.01)

(52) U.S. Cl. ............ 455/522; 455/69; 455/67.11; 455/504; 455/506; 455/135; 370/318; 370/321; 370/339; 370/347; 370/442

(58) Field of Classification Search ........... 455/522, 455/69, 67.11, 504, 506, 135; 370/318, 321, 370/337, 347, 442
See application file for complete search history.

(56) References Cited

U.S. PATENT DOCUMENTS

| | | | | |
|---|---|---|---|---|
| 5,856,804 A * | 1/1999 | Turcotte et al. | | 342/371 |
| 6,175,745 B1 * | 1/2001 | Bringby et al. | | 455/522 |
| 6,181,919 B1 | 1/2001 | Ozluturk | | |
| 6,198,910 B1 * | 3/2001 | Hanley | | 455/67.11 |
| 6,272,354 B1 * | 8/2001 | Saario | | 455/522 |
| 6,463,295 B1 * | 10/2002 | Yun | | 455/522 |
| 6,529,494 B1 * | 3/2003 | Ostman et al. | | 370/337 |
| 6,542,581 B2 * | 4/2003 | Suonsivu et al. | | 379/1.04 |
| 6,694,148 B1 * | 2/2004 | Frodigh et al. | | 455/522 |
| 6,765,897 B2 * | 7/2004 | Cordier et al. | | 370/342 |
| 6,781,969 B2 * | 8/2004 | Nikides et al. | | 370/318 |
| 6,868,075 B1 | 3/2005 | Narvinger et al. | | |
| 2001/0019961 A1 * | 9/2001 | Nakahara et al. | | 455/522 |
| 2002/0010001 A1 | 1/2002 | Dahlman et al. | | |
| 2002/0094834 A1 | 7/2002 | Baker et al. | | |
| 2003/0036403 A1 * | 2/2003 | Shiu et al. | | 455/522 |
| 2003/0086514 A1 * | 5/2003 | Ginis et al. | | 375/346 |
| 2004/0082353 A1 * | 4/2004 | Kekki | | 455/522 |
| 2004/0106426 A1 * | 6/2004 | Koo et al. | | 455/522 |
| 2004/0141473 A1 * | 7/2004 | Buot | | 370/311 |
| 2004/0193971 A1 * | 9/2004 | Soong et al. | | 714/704 |
| 2005/0020296 A1 * | 1/2005 | Baker et al. | | 455/522 |

FOREIGN PATENT DOCUMENTS

| | | |
|---|---|---|
| EP | 0 999 716 | 5/2000 |
| EP | 0999716 | 5/2000 |
| GB | 2 360 909 | 10/2001 |
| GB | 2360909 | 10/2001 |

* cited by examiner

Primary Examiner—Matthew D. Anderson
Assistant Examiner—Sujatha Sharma
(74) Attorney, Agent, or Firm—Volpe and Koenig, P.C.

(57) ABSTRACT

A method for initial downlink transmit power adjustment for non-real time services in a wireless communications network begins by estimating an initial downlink transmit power level for non-real-time services. The estimated power level is then compared with a threshold. A determination is made whether an increase in the estimated power level would affect neighboring cells. If an increase would not affect neighboring cells, then the initial downlink transmit power level is adjusted by a predetermined amount.

9 Claims, 3 Drawing Sheets

INITIAL DOWNLINK TRANSMIT POWER ADJUSTMENT FOR NON-REAL-TIME SERVICES USING DEDICATED OR SHARED CHANNEL

CROSS REFERENCE TO RELATED APPLICATION(S)

This application claims priority from U.S. Provisional application No. 60/517,698 filed on Nov. 5, 2003, which is incorporated by reference as if fully set forth.

FIELD OF THE INVENTION

The present invention relates to adjusting initial downlink transmit power in cellular networks, and more particularly, to adjusting initial downlink transmit power for non-real-time services to improve the experienced quality of service.

BACKGROUND OF THE INVENTION

Due to the bursty nature of non-real-time (NRT) services, the allocation of physical resources for NRT services is also bursty and short. For each allocation, the accuracy of initial downlink transmit power is important to the experienced quality of service, such as the block error rate (BLER), of the allocation. Currently, the initial downlink transmit power is estimated by the controlling radio network controller (C-RNC) using two different schemes according to the availability of measurements.

Due to factors such as fading, mobility, measurement reporting delay, and errors, the initial downlink transmit power can be significantly different from the actual required power to support the signal to interference ratio (SIR). If the initial downlink transmit power is significantly lower than the actual required power, the actual SIR in the beginning of the allocation will be much lower than the required SIR, which will cause many transmission errors. Since the allocation for NRT services is usually short, errors encountered in the beginning of the allocation may not be averaged out through the short allocation duration to meet the required BLER.

SUMMARY

The present invention proposes a solution for cellular networks to adjust the initial downlink transmit power for non-real-time services to improve the experienced quality of service.

A method for initial downlink transmit power adjustment for non-real time services in a wireless communications network begins by estimating an initial downlink transmit power level for non-real-time services. The estimated power level is then compared with a threshold. A determination is made whether an increase in the estimated power level would affect neighboring cells. If an increase would not affect neighboring cells, then the initial downlink transmit power level is adjusted by a predetermined amount.

A method for initial downlink transmit power adjustment for non-real time services in a wireless communications network begins by estimating an initial downlink transmit power level for non-real-time services. An estimated slot carrier power is calculated and is compared with a threshold. The initial downlink transmit power is adjusted based upon the comparison result. Based on the threshold used for the comparison, the initial downlink transmit power may be increased or may remain at the initial setting.

BRIEF DESCRIPTION OF THE DRAWINGS

A more detailed understanding of the invention may be had from the following description of preferred embodiments, given by way of example, and to be understood with reference to the accompanying drawings in which.

DETAILED DESCRIPTION OF PREFERRED EMBODIMENT(S)

Figure 1:
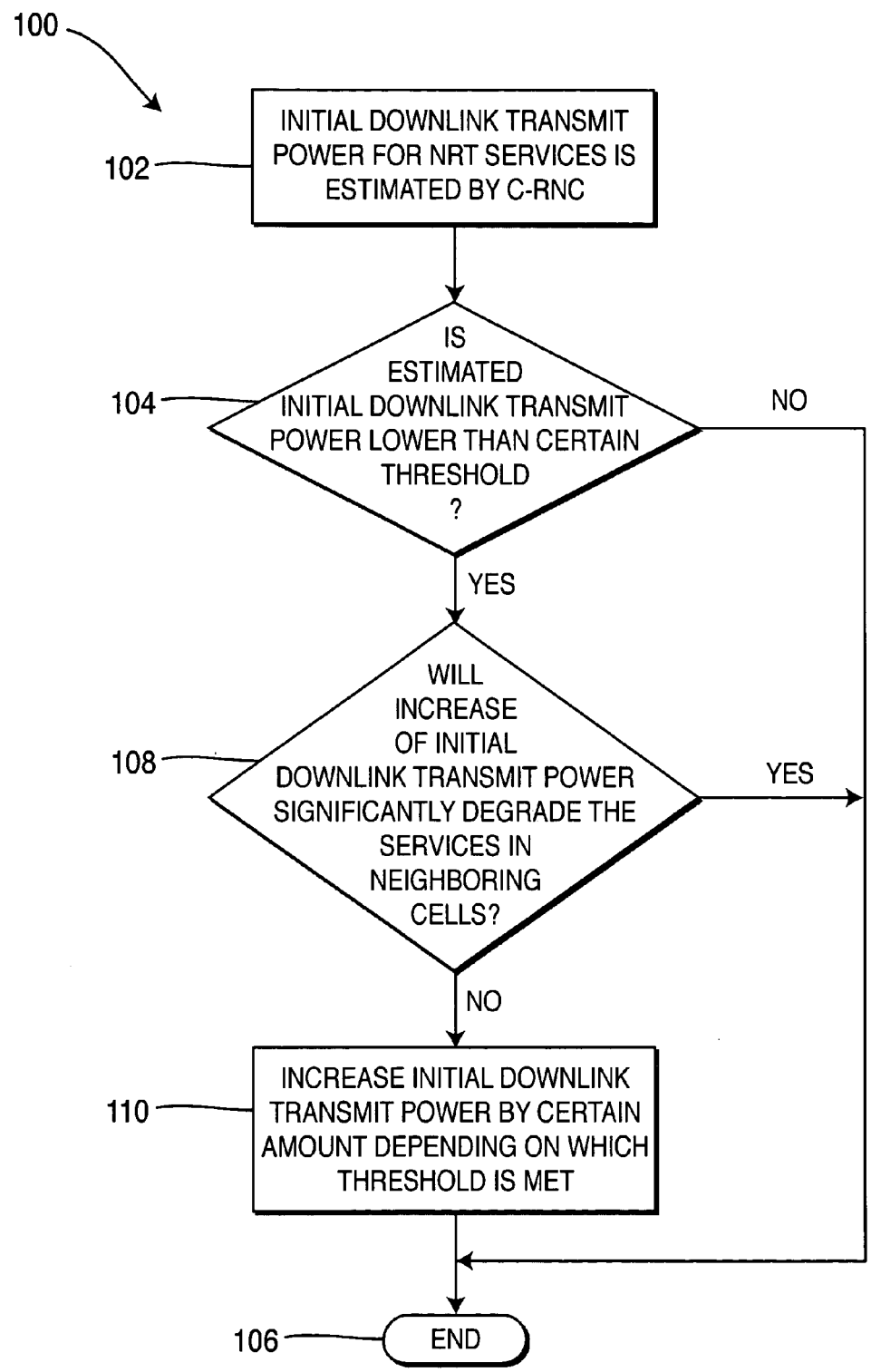
FIG. 1 is a flowchart of a general strategy of initial downlink transmit power adjustment for non-real-time services.

FIG. 1 shows a flowchart of a method 100 of the initial downlink transmit power as estimated by the C-RNC, which uses a full-measurement based algorithm or a common-measurement based algorithm. The full-measurement based algorithm is used when dedicated and common measurements are available to the RNC, while the common-measurement based algorithm is used when only common measurements are available to the RNC. The method 100 begins by the C-RNC estimating the initial downlink transmit power for NRT services (step 102). The estimated initial downlink transmit power is compared to a threshold (step 104), and if the estimated power is above the threshold, the method terminates (step 106).

If the estimated power is lower than the threshold (step 104), then a determination is made whether an increase of the initial downlink transmit power would significantly degrade the services in neighboring cells (step 108). If there would be a significant degrade in the services in a neighboring cell, then no power adjustment is made, and the method terminates (step 106). However, if there would not be a significant degrade in the services in a neighboring cell, then the initial downlink transmit power is increased by a certain amount (step 110), depending on which threshold was met in step 104. The method then terminates (step 106).

Intuitively, increasing the initial downlink transmit power properly when conditions allow improves performance. In one embodiment, the initial downlink transmit power is increased only if the following conditions are met:

1) The initial downlink transmit power estimated by the C-RNC is lower than a certain threshold.

2) The increase of the initial downlink transmit power will not degrade the services in neighboring cells significantly (for example, by causing congestion conditions). This effect can be gauged by the carrier power of a neighboring base station (BS) or the downlink interference.

There can also be multiple thresholds for the initial downlink transmit power. Each threshold has an amount of transmit power increase associated with it. The amount of the increase and the value of the thresholds also depend on the required BLER of the NRT services, because the required BLER is an indicator of the tolerance of initial transmission errors.

Figure 2:
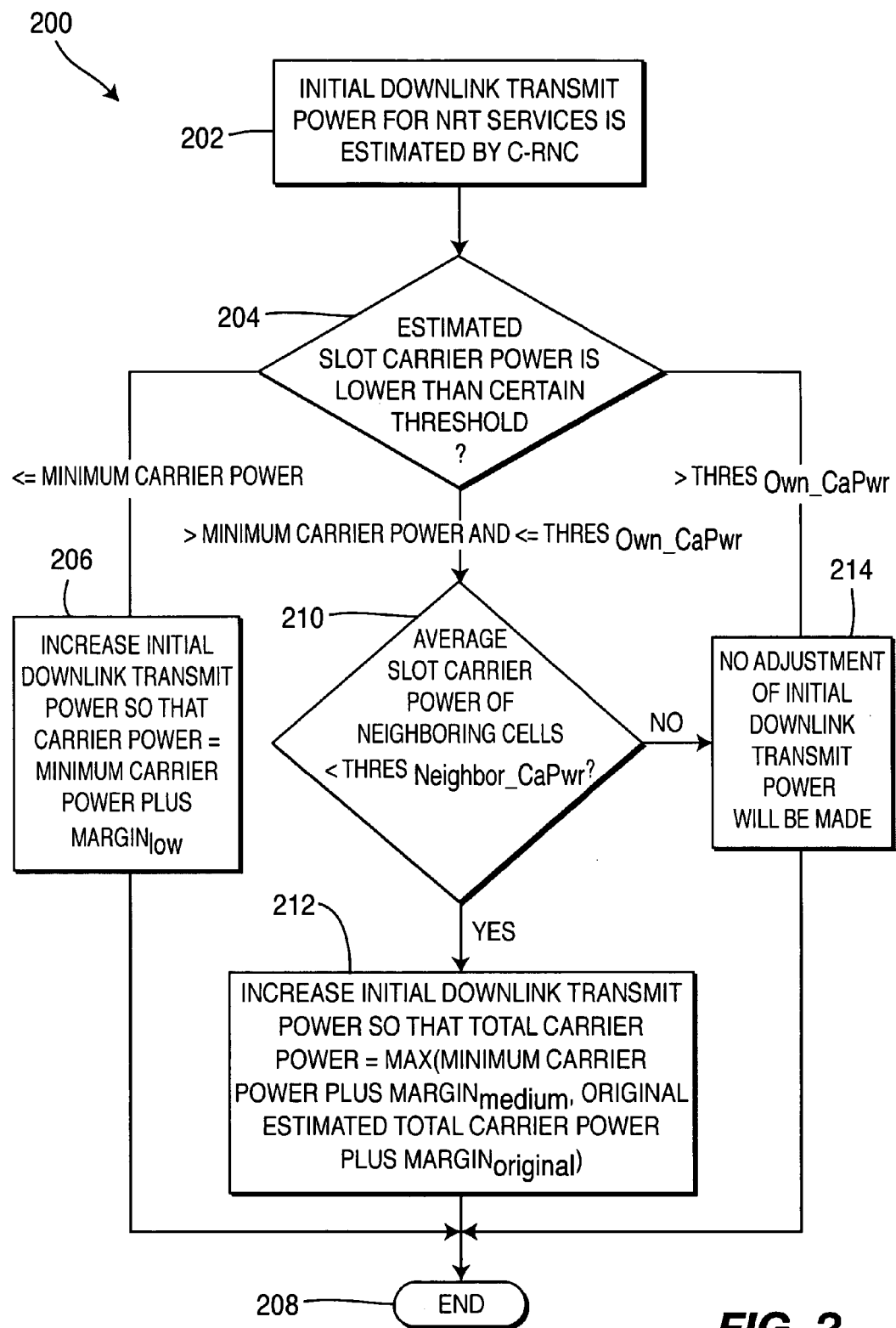
FIG. 2 is a flowchart of an implementation of the strategy shown in FIG. 1 for wideband code division multiple access (WCDMA) time division duplex (TDD) systems.

A solution to the initial downlink transmit power problem for NRT services in a WCDMA TDD system is shown in FIG. 2. A method 200 begins by the C-RNC estimating the initial downlink transmit power for NRT services (step 202). Next, a determination is made whether the estimated slot carrier power, which is equal to the estimated initial downlink transmit power plus the current slot carrier power, is lower than a certain threshold (step 204). If the estimated slot carrier power is less than the minimum Node B carrier power, then the initial downlink transmit power is increased so that the total slot carrier power equals the minimum Node B carrier power plus a margin, which is denoted by $Margin_{low}$ (step 206). $Margin_{low}$ is a design parameter whose typical value is in the range of 2–5 dB. The lower the value of required BLER, the higher the value of $Margin_{low}$. The method then terminates (step 208).

If the estimated slot carrier power is greater than the minimum Node B carrier power but less than a carrier power threshold ($Thres_{Own\_CaPwr}$; step 204), a determination is made whether the average slot carrier power of neighboring cells is below a certain threshold, which is denoted by $Thres_{Neighbor\_CaPwr}$ (step 210). Alternatively, the interference signal code power (ISCP) of this wireless transmit/receive unit (WTRU) in the timeslot of this cell may be used, and is designated by $Thres_{Neighbor\_ISCP}$. These thresholds are determined jointly by the maximum allowed slot carrier power of the Node B and the required BLER of the NRT services. The higher the maximum allowed slot carrier power, the higher the thresholds will be. Additionally, the lower the value of the required BLER, the higher these thresholds will be.

If the average slot carrier power is below $Thres_{Neighbor\_CaPwr}$, the initial downlink transmit power is increased such that the total slot carrier power is equal to the greater of: the minimum Node B carrier power plus a margin, denoted by $Margin_{medium}$, or the original estimated total slot carrier power plus a margin, denoted by $Margin_{original}$ (step 212). $Margin_{medium}$ is determined as the highest value of a margin so that the interference caused by the minimum Node B carrier power plus $Margin_{medium}$ will not cause the slot carrier power of a neighboring cell to approach its maximum allowed value. $Margin_{original}$ is determined as the highest value of a margin so that the interference caused by the Node B carrier power at the level of $Thres_{Own\_CaPwr}$ plus $Margin_{original}$ will not cause the slot carrier power of a neighboring cell to approach its maximum allowed value. The method then terminates (step 208).

If, in step 210, the average slot carrier power of neighboring cells is greater than $Thres_{Neighbor\_CaPwr}$, then no adjustment of initial downlink transmit power is made (step 214) and the method terminates (step 208). If the estimated slot carrier power is greater than the carrier power threshold ($Thres_{Own\_CaPwr}$; step 204), then no adjustment of initial downlink transmit power is made (step 214) and the method terminates (step 208).

It is noted that all the parameters (i.e., the margins and the thresholds) used in the method 200 are related to BLER either directly or indirectly. In practice, all of the parameters can be fine-tuned through simulations or field tests/trials.

Figure 3:
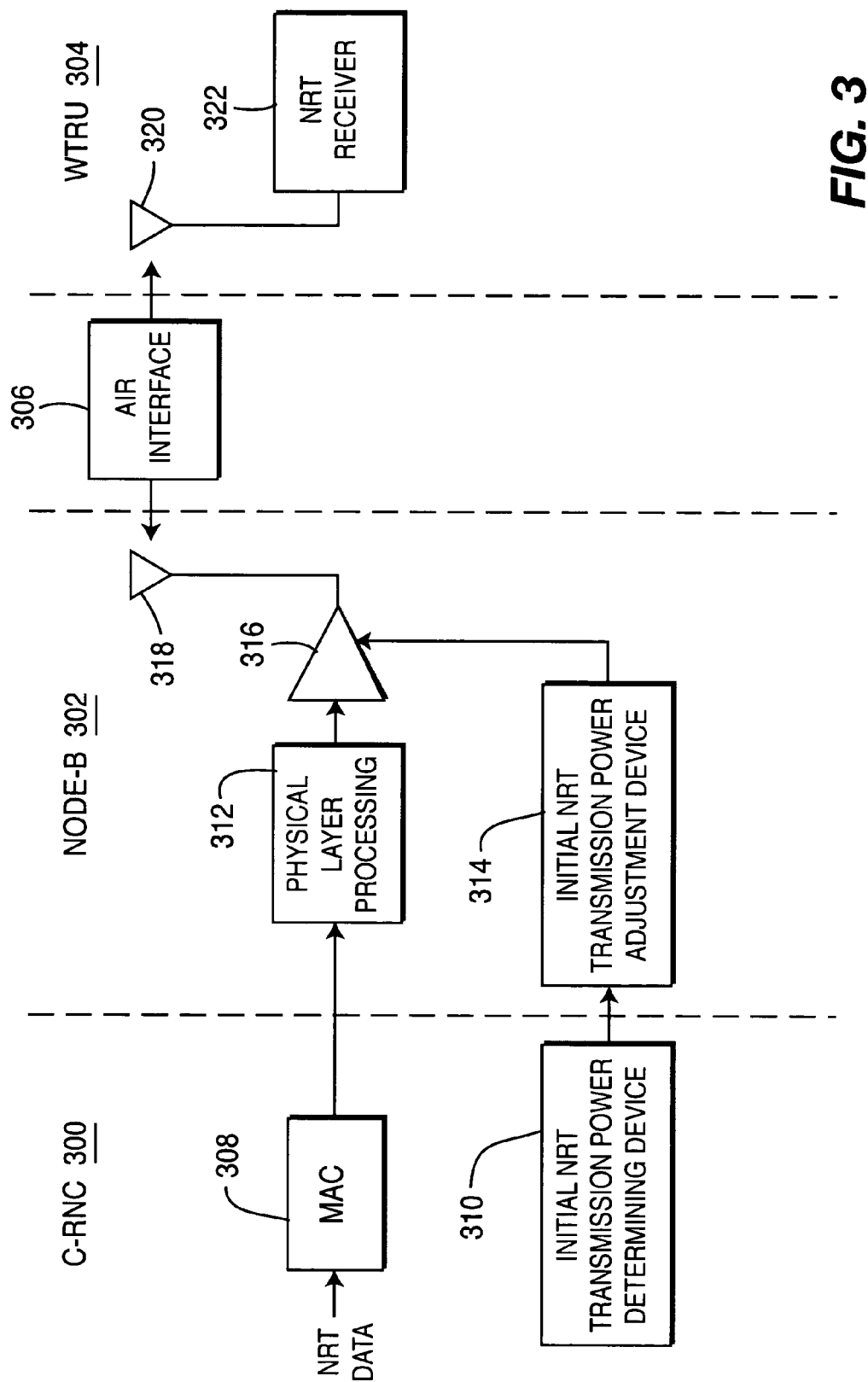
FIG. 3 is a simplified block diagram of a system using initial downlink transmit power adjustment for non-real-time services.

FIG. 3 is a simplified block diagram of an embodiment for initial downlink transmit power adjustment for non-real-time services. A C-RNC 300 receives NRT data. A medium access controller 308 schedules the NRT data for transmission. The C-RNC 300 also has an initial NRT transmission power determining device 310 for determining an initial transmission power level for the NRT data.

The scheduled NRT data is sent to physical layer processing 312 at the Node B 302 to be formatted for transmission over the air interface 306. An initial NRT transmission power adjustment device 314 adjusts the initial transmission power level estimate as previously described. The adjusted initial transmission power level determination is used to adjust the gain of an amplifier 316. The amplified NRT signal is radiated by an antenna 318 or an antenna array through the air interface 306. The WTRU 304 receives the NRT signal using its antenna 320 or antenna array and recovers the NRT data using an NRT receiver 322.

While specific embodiments of the present invention have been shown and described, many modifications and variations could be made by one skilled in the art without departing from the scope of the invention. The above description serves to illustrate and not limit the particular invention in any way.

What is claimed is:

1. A method for initial downlink transmit power adjustment for non-real time services in a wireless communications network, comprising the steps of:
   estimating an initial downlink transmit power level for non-real-time services;
   comparing the estimated power level with a threshold;
   determining whether an increase in the estimated power level would degrade services in neighboring cells; and
   based on the determining step, adjusting the initial downlink transmit power level by a predetermined amount.

2. The method according to claim 1, wherein
   the comparing step includes comparing the estimated power level with at least two thresholds; and
   the predetermined amount is based on how the estimated power level compares to the at least two thresholds.

3. A method for initial downlink transmit power adjustment for non-real time services in a wireless communications network, comprising the steps of:
   estimating an initial downlink transmit power level for non-real-time services;
   calculating an estimated slot carrier power;
   comparing the estimated slot carrier power with at least two thresholds; and
   adjusting the initial downlink transmit power based on how the estimated slot carrier power compares to the at least two thresholds.

4. The method according to claim 3, wherein said calculating step includes adding the estimated initial downlink transmit power to a current slot carrier power.

5. The method according to claim 3, wherein said comparing step includes comparing the estimated slot carrier power with a minimum carrier power level of a Node B.

6. The method according to claim 5, wherein said adjusting step includes increasing the initial downlink transmit power, whereby the total carrier power equals the minimum carrier power plus a margin value.

7. The method according to claim 3, wherein said comparing step includes determining if the estimated slot carrier power is greater than a minimum carrier power level of a Node B and less than a carrier power threshold.

8. The method according to claim 7, wherein said adjusting step includes
   determining whether an average slot carrier power of neighboring cells is less than a threshold; and
   if the average slot carrier power is below the threshold, then increasing the initial downlink transmit power, whereby the total carrier power equals the greater of the minimum carrier power plus a first margin value and the estimated slot carrier power plus a second margin value.

9. The method according to claim 3, wherein said comparing step includes comparing the estimated slot carrier power with a carrier power threshold.

* * * * *